United States Patent
Bernardele et al.

(10) Patent No.: US 9,690,318 B2
(45) Date of Patent: Jun. 27, 2017

(54) CONTROL DEVICE AND SYSTEM OF A BICYCLE ELECTRONIC SYSTEM

(71) Applicant: Campagnolo S.r.l., Vicenza (IT)

(72) Inventors: Davide Bernardele, Caldogno (IT); Flavio Cracco, Vicenza (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 14/543,184

(22) Filed: Nov. 17, 2014

(65) Prior Publication Data

US 2015/0135888 A1 May 21, 2015

(30) Foreign Application Priority Data

Nov. 19, 2013 (IT) .............................. MI2013A1912

(51) Int. Cl.
| | |
|---|---|
| *H01H 13/70* | (2006.01) |
| *G05G 1/04* | (2006.01) |
| *B62K 23/02* | (2006.01) |
| *B62M 25/04* | (2006.01) |
| *B62M 25/08* | (2006.01) |

(52) U.S. Cl.
CPC .............. *G05G 1/04* (2013.01); *B62K 23/02* (2013.01); *B62M 25/045* (2013.01); *B62M 25/08* (2013.01); *Y10T 74/20612* (2015.01)

(58) Field of Classification Search
CPC .... B62M 25/02; B62M 25/04; B62M 25/045; B62M 25/08; B62M 9/122
USPC ......................... 200/343; 701/51, 52; 70/233; 280/288.4, 260, 236
See application file for complete search history.

(56) References Cited

U.S. PATENT DOCUMENTS 3,381,104 A 4/1968 Abell et al.
4,143,557 A * 3/1979 Wakebe ................. B62M 9/122
200/11 DA (Continued)

FOREIGN PATENT DOCUMENTS

EP 1911668 A1 4/2008
EP 2105377 A2 9/2009

(Continued)

OTHER PUBLICATIONS

Italian Search Report and Written Opinion in Italian Application No. IT MI2013A001912, Jul. 31, 2014 with English translation.

(Continued)

*Primary Examiner* — Vanessa Girardi
(74) *Attorney, Agent, or Firm* — Volpe and Koenig, P.C.

(57) ABSTRACT

The present invention refers to a control device and to a control system of a bicycle electronic system as well as to a bicycle electronic system using the same, in particular a bicycle electronic gearshift. In particular, the control device of a bicycle electronic system comprises a containment casing, containing inside it at least one switch, and at least one manual actuation member faced at the containment casing and acting on a respective switch of the at least one switch for imparting at least one manual command to the bicycle electronic system. The containment casing is provided with a housing seat suitable for receiving at least one input multiplier able to be connected to the at least one switch to receive the manual command when the at least one manual actuation member activates the respective switch.

18 Claims, 9 Drawing Sheets

(56) References Cited

U.S. PATENT DOCUMENTS

| | | | |
|---|---|---|---|
| 8,878,658 B2* | 11/2014 | Hara | ...................... B62M 25/00 340/432 |
| 2012/0265413 A1 | 10/2012 | Lin et al. | |
| 2013/0090195 A1 | 4/2013 | Yamaguchi et al. | |
| 2014/0358385 A1 | 12/2014 | Fusari et al. | |

FOREIGN PATENT DOCUMENTS

| | | |
|---|---|---|
| EP | 2567884 A2 | 3/2013 |
| EP | 2808238 A1 | 12/2014 |

OTHER PUBLICATIONS

European Office Action for European Application No. 14 190 432.6, dated May 31, 2016.

\* cited by examiner

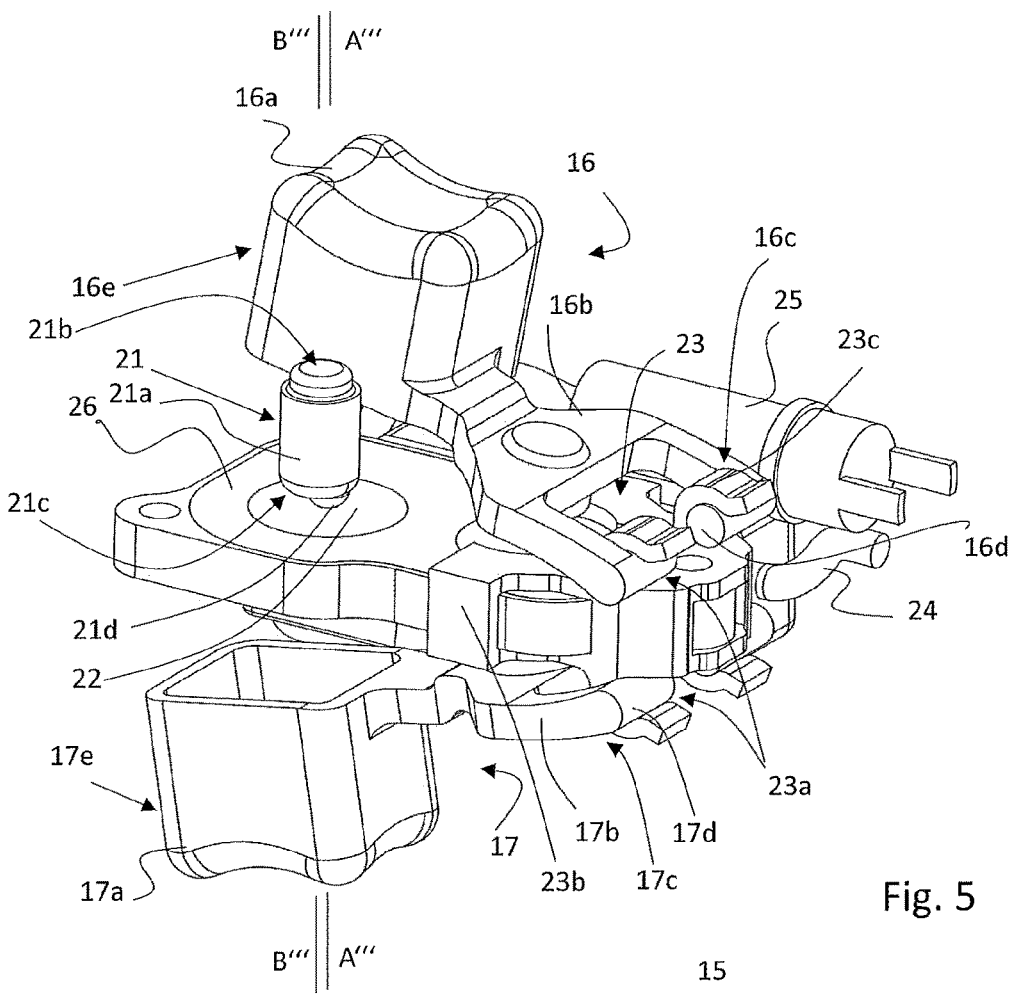
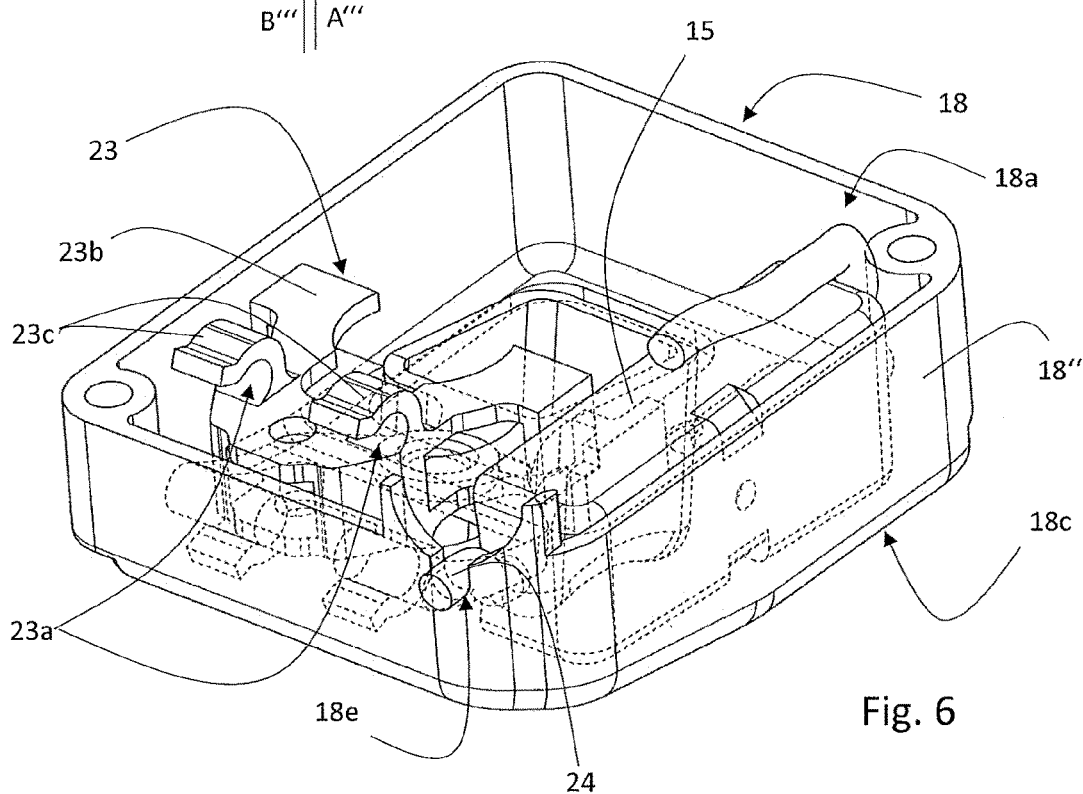

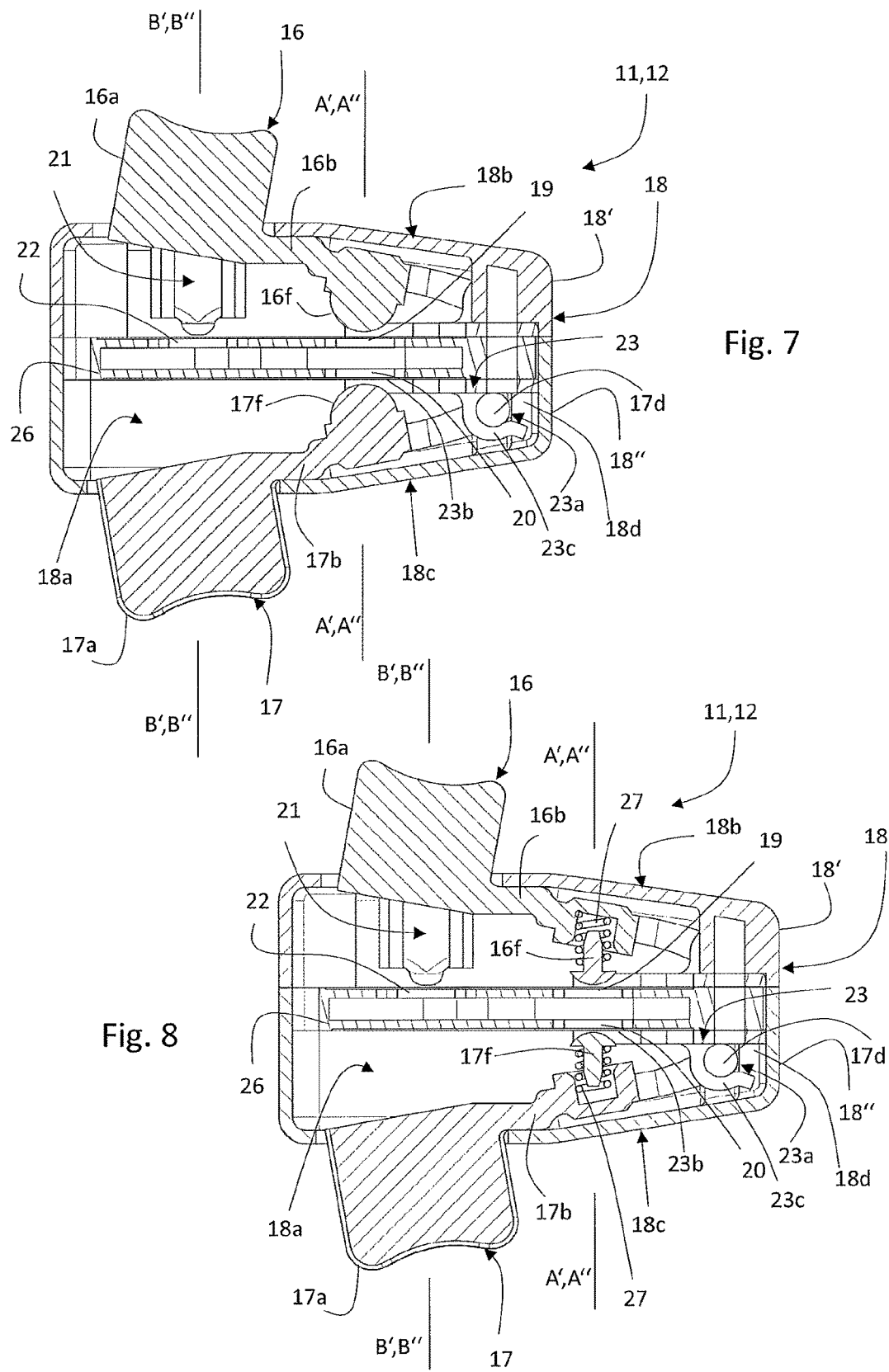

CONTROL DEVICE AND SYSTEM OF A BICYCLE ELECTRONIC SYSTEM

CROSS REFERENCE TO RELATED APPLICATION(S)

This application claims the benefit of Italian Application No. MI2013A001912, which was filed on Nov. 19, 2013, and is incorporated herein by reference as if fully set forth.

FIELD OF INVENTION

The present invention refers to a control device and to a control system of a bicycle electronic system as well as to a bicycle electronic system using the same, in particular a bicycle electronic gearshift.

BACKGROUND

A motion transmission system in a bicycle comprises a chain extending between toothed wheels associated with the axle of the pedal cranks and with the hub of the rear wheel. When there is more than one toothed wheel at at least one of the axle of the pedal cranks and the hub of the rear wheel, and the motion transmission system is therefore equipped with a gearshift, a front derailleur and/or a rear derailleur is provided for. In the case of an electronically servo-assisted gearshift, each derailleur comprises a chain guide element, also called cage, which is movable to move the chain among the toothed wheels in order to change the gear ratio and an electromechanical actuator to move the chain guide element. The actuator in turn typically comprises a motor, typically an electric motor, coupled with the chain guide element by means of a linkage such as an articulated parallelogram, a rack system or a worm screw system, as well as a sensor of the position, speed and/or acceleration of the rotor or of any movable part downstream of the rotor, down to the chain guide element itself. It is worthwhile noting that slightly different terminology from that used in this context is also in use.

Control electronics changes the gear ratio automatically, for example based on one or more detected variables, such as the travel speed, the cadence of rotation of the pedal cranks, the torque applied to the pedal cranks, the slope of the travel terrain, the heart rate of the cyclist and similar, and/or, of particular interest for the present invention, the gear ratio is changed based on commands manually input by the cyclist through suitable control members, for example levers and/or buttons.

A control device of the front derailleur and a control device of the rear derailleur—or just one of the two in the case of simpler gearshifts—are mounted so as to be easy for the cyclist to manoeuvre, normally on the handlebars, close to the handgrips thereof where the brake lever is also located for controlling the front and rear wheel brake, respectively. Control devices that allow to drive both a derailleur in the two directions and a brake are commonly called integrated controls.

By convention, the control device of the front derailleur and the brake lever of the front wheel are located close to the left handgrip, and vice-versa the control device of the rear derailleur and the brake lever of the rear wheel are located close to the right handgrip.

It is well known that in bicycles, in particular if intended for racing, there is an ongoing search for solutions to improve performance. In particular, an objective of bicycle designers is to constantly improve the ease of access to the control devices, so that the cyclist is in a position to be able to concentrate on the physical effort without having to worry about actuating the controls. This requirement is clearly more important when the bicycle is intended to be used in high-level cycling races.

For this purpose, it is for example known to equip bicycles with one or more redundant control devices also known as remote or additional control devices.

Such redundant control devices are positioned on the handlebars and/or on the frame in the positions most easily reached according to the particular postures taken up by the cyclist in the different phases of a race.

The most common redundant control devices generally comprise at least one pair of buttons and/or levers projecting from a containment casing, and means for imparting an electrical control signal, typically comprising a pair of switches actuated by the buttons.

In particular, by acting on a first button, in general called UP, the cyclist typically commands upward gearshifting and by acting on a second button, usually known as DOWN, downward gearshifting is typically commanded.

As a function of the upward and downward gearshifting control signals imparted through the switches of the control devices, a respective derailleur associated with the rear wheel and/or with the axle of the pedal cranks is actuated so as to move the chain among the different toothed wheels respectively associated with the rear wheel and/or with the axle of the pedal cranks, so as to carry out gearshifting and establish the gear ratio selected by the cyclist.

The control signals are typically transmitted to the derailleur by means of an intermediate unit. It is also known from U.S. application Ser. No. 14/290,646, which is incorporated herein by reference as if fully set forth and which claims priority to Italian Application No. MI2013A000895, to provide a direct connection between each control device present on the bicycle and the respective derailleurs.

The control device can comprise other switches, including for example a control switch called MODE for selecting an operating mode and/or a control switch called SET for setting the various parameters of the system.

The Applicant has realized that in known bicycle electronic systems, provided with one or more redundant control devices, the electrical connection between the control devices and the rest of the electronic system, in particular the derailleurs, entails a fair number of drawbacks.

The Applicant has found that such a type of connection requires the use of a large amount of conductors arranged at or close to the handlebars, making such an area accessible only with extreme caution not to hit and/or pull the multiple cables.

It is also known to provide a bicycle electronic system in which the main control device is provided with an input connector and with an output connector, thus being able to be interconnected between the intermediate unit and the redundant control device.

The Applicant has however noted that such a solution, while reducing the overall amount of cables that it is necessary to arrange at or near to the handlebars for the connection of the control system, is not very reliable. Indeed, the connection in series between the two control devices brings about that a possible malfunction of the main control device also makes the redundant control device unusable.

The Applicant has also found that such a bicycle electronic system needs a specially designed main control device, which differs from the redundant control device at least in the amount of connectors with which it is provided.

Therefore, it is not possible to exploit large-scale effects, at least for the production of the redundant control device, in general used only in bicycles intended for high level races.

Moreover, the control devices of a bicycle electronic system currently used mostly provide for the pair of buttons UP and DOWN to be arranged on a same face of the containment casing of the electronic components of the control device.

The Applicant has noted that, depending on the assembly of the control device on the handlebars or on the bicycle frame, the actuation of buttons arranged on a same face necessarily requires, in a first scenario, the thumb to be continually moved between one button and the other according to the command that is to be imparted, or, in a second scenario, the commands to be imparted through the aid of two of the remaining fingers of one's hand.

The Applicant has found drawbacks associated with both scenarios: in case the actuation takes place by just the thumb, it is necessary to continually reposition the thumb, so that it is able to actuate the correct button each time, in this way introducing delays and imprecisions in actuation; in the scenario in which the actuation takes place through the remaining fingers of one's hand, conversely, there is a loss of the efficiency of actuation known to be associated with the thumb.

Other embodiments of control devices of bicycle electronic systems provide for buttons arranged on opposite faces, therefore able to be actuated using the index finger and the thumb.

However, the buttons of such devices are generally located in a same position in the respective face of the casing, therefore actually arranged in a corresponding position with each other.

The Applicant has noted that the actuation of buttons thus arranged is however not very convenient, in particular due to the substantial difference in length of the fingers used for actuation, which does not make it easy to operate in opposite points corresponding to one another.

Furthermore, in currently used bicycle control devices, the manual actuation axis of the button coincides with the actuation axis of the electronic switch actuated by the button.

The Applicant has found that satisfying this structural requirement brings about particularly strict design restrictions that do not allow optimization of layout, overall requiring greater bulk.

Last but not least, in known control devices of a bicycle electronic system, the buttons are generally constrained to the casing through the use of pins passing through slots, which allow the button to move by rotating by a small amount between its rest position and the switch actuation position.

The Applicant has noted that such a solution of constraint between the buttons and the casing takes long assembly times, lengthening the time needed overall to make and manufacture the control devices.

The problem at the basis of the invention is to avoid the aforementioned drawbacks, in particular providing a control device of a bicycle electronic system that does not require the use of multiple connection cables to be positioned at the handlebars, and at the same time ensures operating reliability.

SUMMARY OF THE INVENTION

The present invention concerns a control device of a bicycle electronic system comprising a containment casing, containing inside it at least one switch, and at least one manual actuation member faced at the containment casing and acting on a respective switch of the at least one switch to impart at least one manual command to the bicycle electronic system. The containment casing is provided with a housing seat suitable for receiving at least one input multiplier able to be connected to the at least one switch to receive the manual command when at least one of the at least one manual actuation member activates the respective switch.

BRIEF DESCRIPTION OF THE DRAWING(S)

Further features and advantages of the present invention shall become clearer from the following detailed description of some preferred embodiments thereof, made with reference to the attached drawings. The different features in the individual configurations can be combined as desired according to the previous description, if one would obtain the advantages resulting specifically from a particular combination.

In the drawings:

FIG. 5 is an axonometric view of the internal components of the control device of FIG. 3;

FIG. 6 is an axonometric view of some details of the control device of FIG. 3;

FIG. 7 is a sectional view of the control device of FIG. 3;

FIG. 8 is a sectional view of a second embodiment of a control device of a bicycle electronic system according to the present invention;

DETAILED DESCRIPTION OF THE PREFERRED EMBODIMENT(S)

Figure 1:
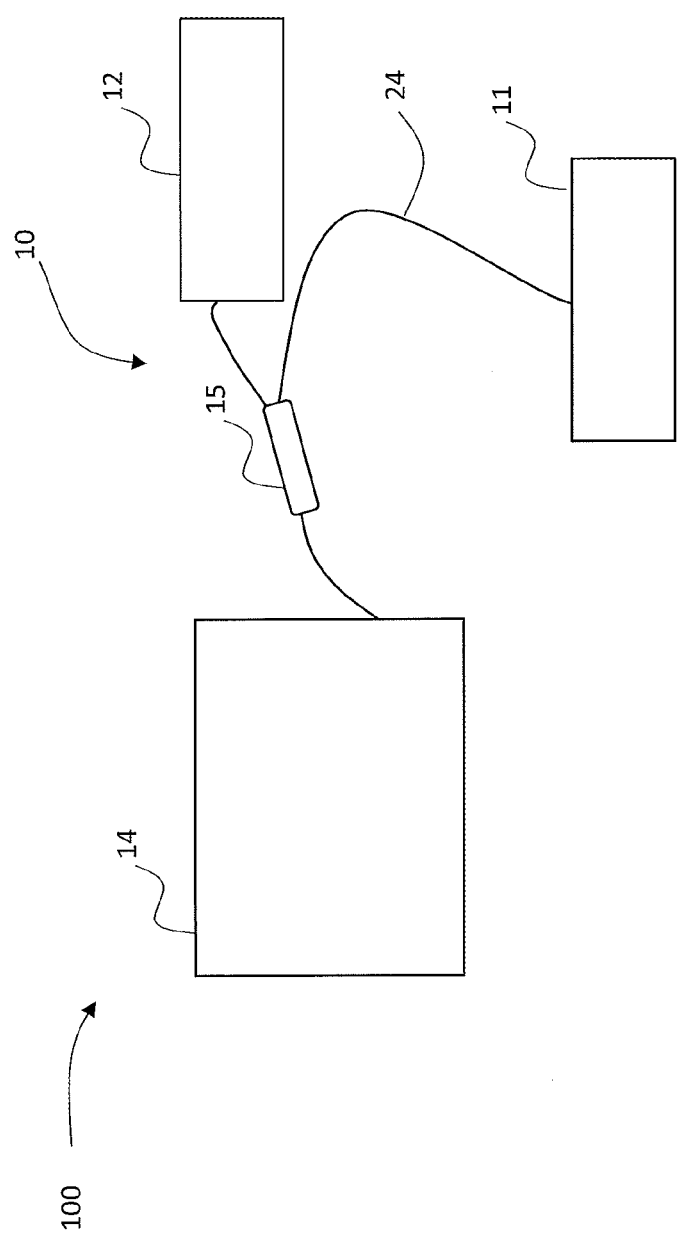
FIG. 1 is a schematic view of a first embodiment of a control system and of a bicycle electronic system according to the present invention.

In the following description, in order to illustrate the figures identical reference numerals are used to indicate constructive elements with a same function. For the sake of clarity of illustration, some reference numerals are not repeated in all the figures.

A control device of a bicycle electronic system comprising a containment casing, containing inside it at least one switch, and at least one manual actuation member faced at the containment casing and acting on a respective switch of the at least one switch to impart at least one manual command to the bicycle electronic system is provided. The containment casing is provided with a housing seat suitable for receiving at least one input multiplier able to be connected to the at least one switch to receive the manual command when at least one of the at least one manual actuation member activates the respective switch.

It is thus possible to optimize the connections between the single parts of the electronic system, avoiding multiplying the cabling near to or at the bicycle handlebars.

Moreover, it is not necessary to devise and make dedicated control electronics that provides for plural connectors to make a connection in series of a main control device and a redundant one. On the other hand, the typical drawbacks of connections in series are avoided.

In this way it is also possible to make bicycle electronic systems that are particularly versatile, capable of integrating an input multiplier without the need to make modifications to the system architecture or to create special housings on the bicycle to install an additional element.

This embodiment of the control device of a bicycle electronic system can be further improved through the following additional features that can be combined with one another as desired.

Preferably, the housing seat is suitable for receiving the at least one input multiplier in a removable manner.

Thanks to the removable housing seat, a same control device can be used both as a main device, possibly without input multiplier, and as a redundant device, possibly provided with an input multiplier, in this way making it possible to exploit large-scale production effects.

More preferably, the control device comprises at least one input multiplier housed in the seat of the containment casing and connected to the at least one switch.

Preferably, the at least one manual actuation member has its actuation axis parallel to and not coinciding with an actuation axis of the respective switch.

This represents an inventive aspect per se also irrespectively of the features indicated above and hereinafter.

Such relative arrangement between the manual actuation member and the switch makes it possible to optimize the layout of the device, in particular it being possible to integrate a large number of actuation members and at the same time substantially keeping the current control electronics and bulk.

Preferably, the at least one manual actuation member comprises a lever arm constrained at a first end to a pin element and, at a second end, to a manual actuation body faced at the containment casing, where the lever arm comprises an actuation element facing towards the respective switch.

More preferably, the actuation element is arranged between the pin element and the manual actuation body.

In this way, it is possible to make a manual actuation member that can also act on a switch not really arranged at the actuation axis of the member, achieving an optimization of layout and bulk.

Even more preferably, the actuation element is a dome-shaped projection made in one piece with the lever arm.

Even more preferably, the dome-shaped projection has a hemi-spherical configuration.

Making the actuation element like a projection made in one piece with the lever arm makes it possible to obtain benefits in terms of production of the control device for which it is not therefore necessary to obtain and mount an independent actuation element. Moreover, it has been seen that the particular hemi-spherical dome shape makes it possible to obtain a good feeling of actuation of the switch.

Preferably, the reciprocal arrangement between the manual actuation body, the actuation element and the pin element is such that the connection line between the actuation axis of the respective manual actuation member and the actuation axis of the actuation element, coinciding with the axis of the respective switch, projected in the plane perpendicular to such axes and comprising the axis of the pin element, intersects such an axis of the pin element according to a different inclination to perpendicular.

In other words, the manual actuation member has a non-rectilinear layout that makes it possible to obtain a reciprocal arrangement that is optimized in terms of bulk among the manual actuation body, the actuation element and the pin element.

Preferably, the pin element is constrained so as to be free to rotate to a releasable holding member comprising at least one elastically deformable seat suitable for holding the pin element by shape and/or forced fitting.

This makes it even quicker and simpler to assemble the control device for which it is no longer necessary to couple the manual actuation members with the containment casing through the assembly of pins inserted in slots.

More preferably, the holding member comprises a central body from which a plurality of C-shaped projections extend, intended to wrap around the pin element of the at least one manual actuation member, in this way making the elastically deformable holding seat.

The particular configuration of the holding seats makes it particularly simple to fix the manual actuation member to the releasable holding member, indeed only requiring the pin elements to be snap-inserted into the C-shaped seats.

In particular, a first group of C-shaped projections is intended to receive a pin element of a first manual actuation member, and a second group of C-shaped projections is intended to receive a pin element of a second manual actuation member.

Preferably, the first group of C-shaped projections extends from the central body in the opposite direction with respect to the second group.

Even more preferably, the C-shaped projections are arranged with the opening of the "C" facing towards the inner wall of the containment casing.

In this way, once the pin elements are inserted in the holding seats and the assembly is mounted in the containment casing, such seats are closed on all sides, therefore securing the pin elements against accidentally slipping out.

Preferably, the containment casing comprises, at the inner wall, at least one rib suitable for cooperating with the releasable holding member to hold the pin element once inserted in the seat.

The rib present in the inner wall of the containment casing secures the pin elements even more against accidental slipping out even during heavy knocks, for example after the bicycle falls at speed.

Preferably, the control device comprises at least two manual actuation members faced at opposite faces of the containment casing.

More preferably, the at least two manual actuation members have actuation axes that are parallel to one another and do not coincide. This represents an inventive aspect per se irrespectively of the features indicated above and hereinafter.

Such an arrangement with parallel but not coinciding actuation axes allows the cyclist to be offered conditions of optimal ergonomics, making the manual actuation members in the most suitable positions for actuation by the fingers, in particular index and thumb, taking into account the different configurations thereof.

Moreover, such a feature allows the production of the control devices to be optimized since the manual actuation members can have the same configuration, therefore being able to be obtained through a single mould still not having rectilinear layout.

In particular, two manual actuation members with non-rectilinear and identical layout can be mounted on the two opposite faces, obtaining a particularly ergonomic and efficient control device.

Preferably, at least one manual actuation member of the at least two manual actuation members has actuation axis passing externally with respect to the opposite faces of the containment casing.

Such a particular arrangement makes it possible to obtain more space in the control device for the arrangement of possible further manual actuation members.

More preferably, the groups of projections of the releasable holding member associated with the pin elements of different manual actuation members extend from the central body in opposite directions and are made at different positions along a direction of extension of the faces of the containment casing.

In this way it is possible to obtain a control device provided with a manual actuation member with actuation axis passing externally to the containment casing, still using identical manual actuation members, in particular having a same length, and therefore obtainable through a single mould.

Preferably, the control device comprises a third manual actuation member acting on a respective third switch.

Advantageously, a control device provided with a third manual actuation member is able to also impart additional commands, like for example setting a gearshifting mode or setting various further parameters.

Even more preferably, the third manual actuation member has its actuation axis parallel to and not coinciding with the actuation axis of the respective switch.

In this way it is possible to arrange the third manual actuation member in close proximity to one of the two actuation members, optimizing the overall bulk of the control device.

Preferably, the third manual actuation member comprises a cylindrical body that faces, at a first end thereof, at a face of the containment casing, the cylindrical body comprising, at a second end thereof, an actuation element facing towards the respective switch.

More preferably, the actuation element is made like a dome-shaped projection. Such a configuration has proven to obtain a strong feeling of actuation of the switch.

Alternatively, the third manual actuation member comprises a mushroom-shaped body provided with an enlarged part that faces at a face of the containment casing and acting as manual actuation body, and with a central stem that extends towards the inside of the containment casing and faces towards the respective switch, acting as actuation element.

Preferably, the actuation element of the third manual actuation member is arranged eccentrically with respect to the actuation axis of such a third manual actuation member.

An optimal arrangement of the three manual actuation members is thus obtained, which are sufficiently spaced apart, making it particularly easy to access them and therefore making them easier to actuate by the cyclist.

Preferably, the C-shaped projections of the releasable holding member are arranged in part with the opening of the "C" facing towards the central stem of the mushroom-shaped third manual actuation member.

In this way, once the pin elements are inserted in the holding seats and the assembly has been mounted in the containment casing, the holding seats of the pin element are closed on all sides, therefore securing the pin elements against accidental slipping out.

According to another aspect of the invention, a control system of a bicycle electronic system is provided, comprising at least one pair of control devices to impart at least one manual command to the electronic system. At least one input multiplier is comprised, suitable for receiving at least one manual command entered by at least one control device of the at least one pair of control devices, and routing it into the bicycle electronic system.

Such a control system of a bicycle electronic system is particularly advantageous since it has optimised connections among the individual components, avoiding multiplying the cables near to or at the handlebars of the bicycle, and in any case without suffering the typical drawbacks of connections in series.

Moreover, it is not necessary to study and make dedicated control devices, provided with plural connectors to make a connection in series.

In particular, at least one first control device of a bicycle electronic system of the at least one pair of control devices is made according to what is outlined above.

In this way, the control system is particularly versatile, being able to easily integrate an input multiplier without the need to make modifications to the system architecture or create special housings on the bicycle to install an additional element.

Preferably, the at least one input multiplier is arranged inside the first control device of the bicycle electronic system.

In this way it is not necessary to house an additional component on the bicycle, rather, to the contrary, the use of such an additional component is totally hidden to the cyclist.

More preferably, the at least one pair of control devices of the bicycle electronic system comprises at least one main control device and at least one redundant control device, the at least one input multiplier being arranged inside the at least one redundant control device.

In this way there is an optimization in terms of logistics, with it being suitable and convenient to use an input multiplier in bicycles provided with at least one redundant control device. Such a component could on the other hand be omitted in bicycles provided just with main control devices.

According to a further aspect of the invention it is provided to have a bicycle electronic system comprising at least one electronic/electromechanical unit suitable for receiving manual commands and a control system according to the invention, the at least one input multiplier of the control system routing the at least one manual command received towards the electronic/electromechanical unit.

The electronic/electromechanical unit suitable for receiving manual commands can be an electronic control unit for managing at least one front and/or rear derailleur and/or other components or directly a front and/or rear derailleur.

In such a configuration, the bicycle electronic system is advantageously a bicycle electronic gearshift.

Figure 2:
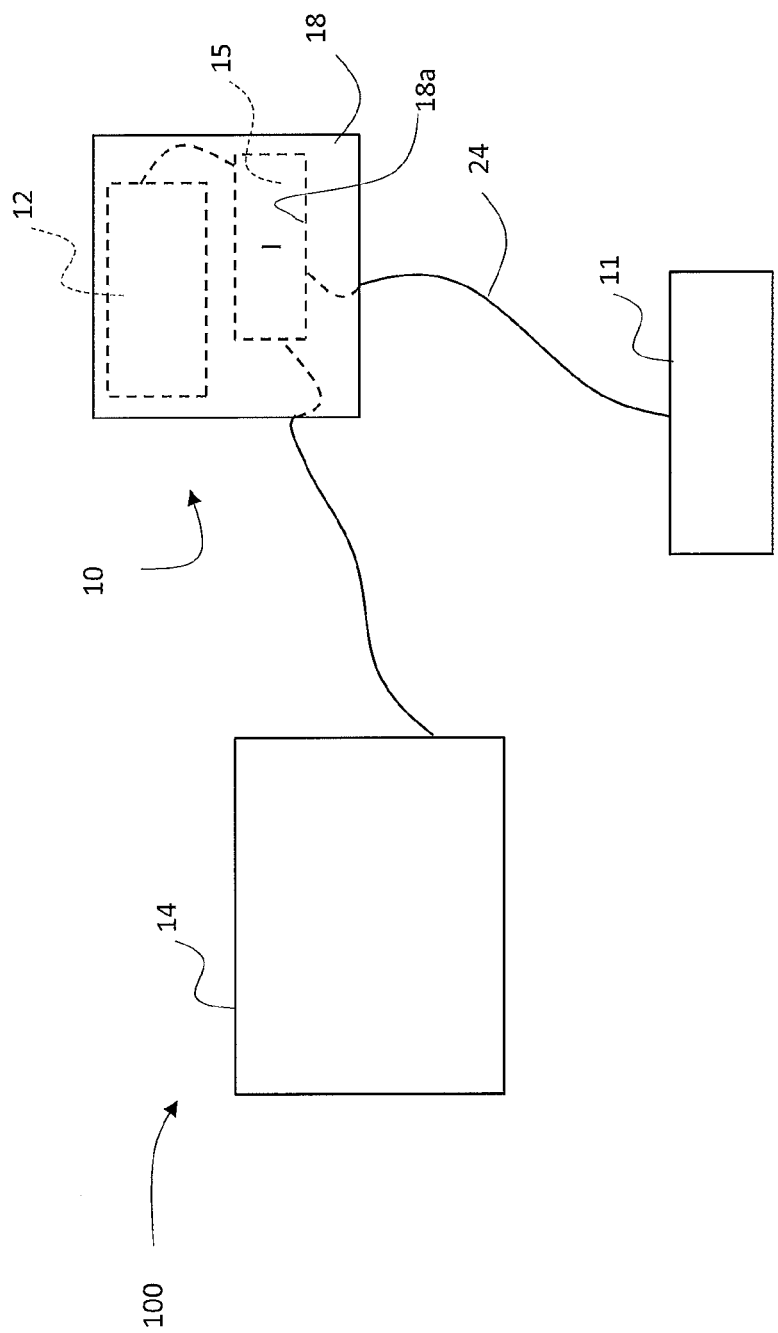
FIG. 2 is a schematic view of a second embodiment of a control system and of a bicycle electronic system according to the present invention.

With reference to FIGS. 1 and 2, a control system of a bicycle electronic system, wholly indicated with 10, and a bicycle electronic system, wholly indicated with 100, are shown.

The bicycle electronic system 100 illustrated in FIGS. 1 and 2 comprises at least one electronic/electromechanical unit 14 suitable for receiving control signals imparted manually—hereinafter indicated as manual controls—and a control system 10 suitable for entering such manual controls into the electronic/electromechanical unit 14.

The electronic/electromechanical unit 14 typically comprises at least one front and/or rear derailleur 14 (not illustrated), as well as possible further electronic units (not illustrated) suitable for directly or indirectly controlling the at least one derailleur.

The control system 10 comprises at least one pair of control devices 11, 12 to impart manual commands to a bicycle electronic system 100.

Various embodiments of control devices 11,12 are illustrated in FIGS. 3-15.

A control device 11,12 of the bicycle electronic system 100 comprises, in general terms, a containment casing 18, containing inside it at least one switch 19,20,22, and at least one manual actuation member 16,17,21 faced at the containment casing 18 and acting on a respective switch 19,20, 22 of the at least one switch 19,20,22 to drive upward and/or downward gearshifting, respectively, and/or to set gearshifting parameters or more generally to impart manual controls to the bicycle electronic system 100.

Advantageously, the control system 10 of the bicycle electronic system 100 according to the present invention additionally comprises at least one input multiplier 15 interconnected between the pair of control devices 11,12 and the electronic/electromechanical unit 14 suitable for receiving manual commands.

In the embodiments illustrated in FIGS. 1 and 2, the pair of control devices 11,12 comprises at least one main control device 11 and at least one redundant control device 12.

For each main control device 11 there can be plural redundant control devices 12 spread over the handlebars and/or along the bicycle frame, in the positions most easily reached according to the particular postures that the cyclist takes up during the various phases of a race.

Preferably, there are two main control devices 11, respectively associated with the rear derailleur and with the front derailleur, and at least one redundant control device 12 for each main control device 11.

In the embodiment illustrated in FIG. 2, the input multiplier 15 is housed inside the redundant control device 12.

For this purpose, the redundant control device 12 comprises a containment casing 18 provided with a housing seat 18a suitable for receiving, preferably in a removable manner, the input multiplier 15.

Preferably, the containment casing 18 consists of two half-shells 18',18" (see FIGS. 7-11, 13 and 14), wherein the housing seat 18a is preferably made entirely in a single half-shell 18".

The housing of the input multiplier 15 inside the containment casing 18 of the redundant control device 12 is such as to allow the connection of the switches 19,20,22 of such a redundant driver 12 as well as of the main driver 11, as input to the multiplier 15. Therefore, there is at least one opening 18e (see FIGS. 6 and 10) in the containment casing 18 for the passage of the respective connection cable 24 towards the outside.

The connection to the redundant control device 12 is carried out through internal cabling that from the input multiplier 15 goes to the electronics 19,20,22,26,26a of the redundant control device 12.

From such an opening 18e, a connector 25 also faces for the connection downstream of the input multiplier 15 to the electronic/electromechanical unit 14 or other unit suitable for receiving a manual command signal.

Alternatively, the input multiplier 15 can be housed inside the main control device 11 which, in that case, will comprise a suitable housing seat 18a inside its own containment casing 18. Similarly, the internal and external connections between the input multiplier 15 and the main and redundant control devices 11, 12 will be inverted.

The input multiplier 15 receives as an input the control signals of the bicycle electronic system coming from the main control device 11 and/or from the redundant one 12, when one or more switches 19,20,22 are activated through a manual actuation of the respective manual actuation member 16,17,21.

The switches 19,20,22 of a control device 11,12 are preferably integrated on a same printed circuit 26, which is preferably suitably insulated from the access of dust and liquids through a suitable resin or other equivalent material.

The printed circuit 26 further comprises a connector 26a for the connection between the switches 19,20,22 and the input multiplier 15.

The embodiments of the control devices 11,12 illustrated in FIGS. 3-12 comprise a first and a second manual actuation member 16,17 faced at opposite faces 18b,18c of the containment casing 18.

Figure 15:
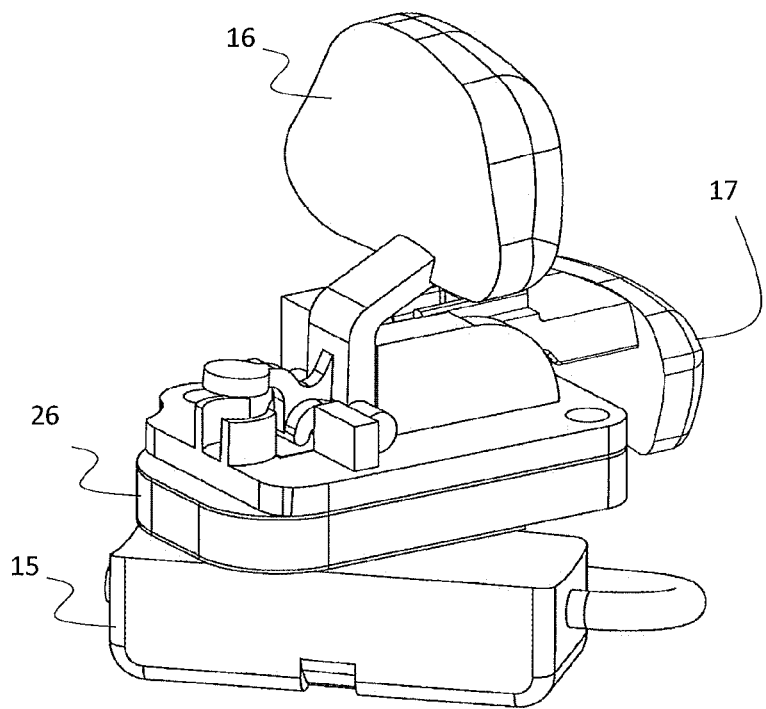
FIG. 15 is an axonometric view of the internal components of a seventh embodiment of a control device of a bicycle electronic system according to the present invention.

In other embodiments of the control devices 11,12, the two manual actuation members 16,17 are faced at the same face 18b of the containment casing 18 (FIGS. 13-14) or at faces of the containment casing 18 that are adjacent and substantially perpendicular to one another (FIG. 15).

Further non-illustrated embodiments are also possible, provided with two manual actuation members having actuation axes inclined to one another by 120° or another suitable angle.

The embodiments of the control devices 11,12 illustrated in FIGS. 4, 5, 7, 8, 10 and 11 have, in addition, a third manual actuation member 21.

Last but not least, not illustrated embodiments are also possible, provided with a single manual actuation member tilting between two operative positions or a slider-like manual actuation member that can translate between two operative positions to actuate two switches.

Preferably, in the embodiments of FIGS. 3-12, each of the first and the second manual actuation member 16,17 has its actuation axis B',B" parallel to and not coinciding with the actuation axis A',A" of the respective switch 19,20.

For this purpose, the first and the second manual actuation member 16,17 comprise a lever arm 16b,17b constrained, at a first end 16c,17c, to a pin element 16d,17d and, at a second end 16e,17e, to a manual actuation body 16a,17a.

In an assembled configuration, the manual actuation body 16a,17a projects from the containment casing 18.

In alternative embodiments that are not illustrated, the manual actuation body 16a,17a, once in assembled configuration, is faced flush with a face of the containment casing 18.

The lever arm 16b,17b further comprises an actuation element 16f,17f facing towards the respective switch 19,20 so as to be able to act thereon.

The actuation element 16f,17f is preferably arranged between the pin element 16d,17d and the manual actuation body 16a,17a.

Figure 3:
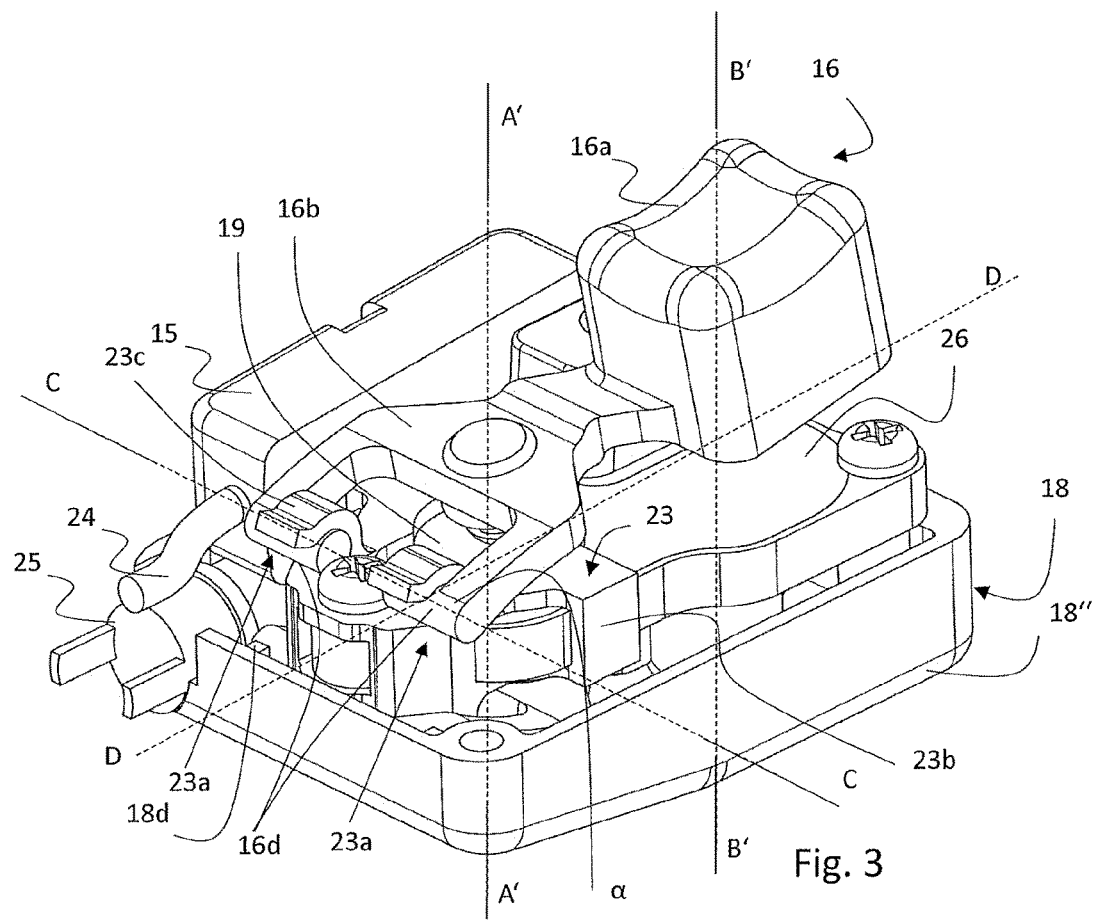
FIG. 3 is an axonometric representation of a first embodiment of a control device of a bicycle electronic system according to the present invention, cut away.

Preferably, as shown in FIG. 3, the reciprocal arrangement among the manual actuation body 16a,17a, the actuation element 16f,17f and the pin element 16d,17d is such that the connection line D between the actuation axis B',B" of the respective manual actuation member 16,17 and the actuation axis A',A" of the actuation element 16f,17f (coinciding with the axis of the respective switch 19,20), projected in the plane perpendicular to such axes A',A",B',B" and comprising the axis C of the pin element 16d,17d, intersects such an axis C of the pin element 16d,17d according to an inclination a different from perpendicular.

Preferably, the switches 19,20 are of the elastic diaphragm type and the actuation element 16f,17f is a dome-shaped projection made in one piece with the lever arm 16b,17b as illustrated in FIGS. 4, 7, 11 and 12.

The dome-shaped projection is preferably hemi-spherical shaped.

Under elastic diaphragm switches, in general terms, switches provided with a diaphragm having substantially sudden deformation that embodies the first contact of the switch are meant. Such a contact, at rest, takes up a first dome-shaped configuration wherein it is electrically insulated from the second contact of the switch. Following a pressure force exerted along the actuation axis A',A" of the switch 19,20, the diaphragm deforms going into physical contact with the second contact and in this way closing the switch 19,20.

In the illustrated embodiments, the second contact is made on the printed circuit 26.

Figure 4:
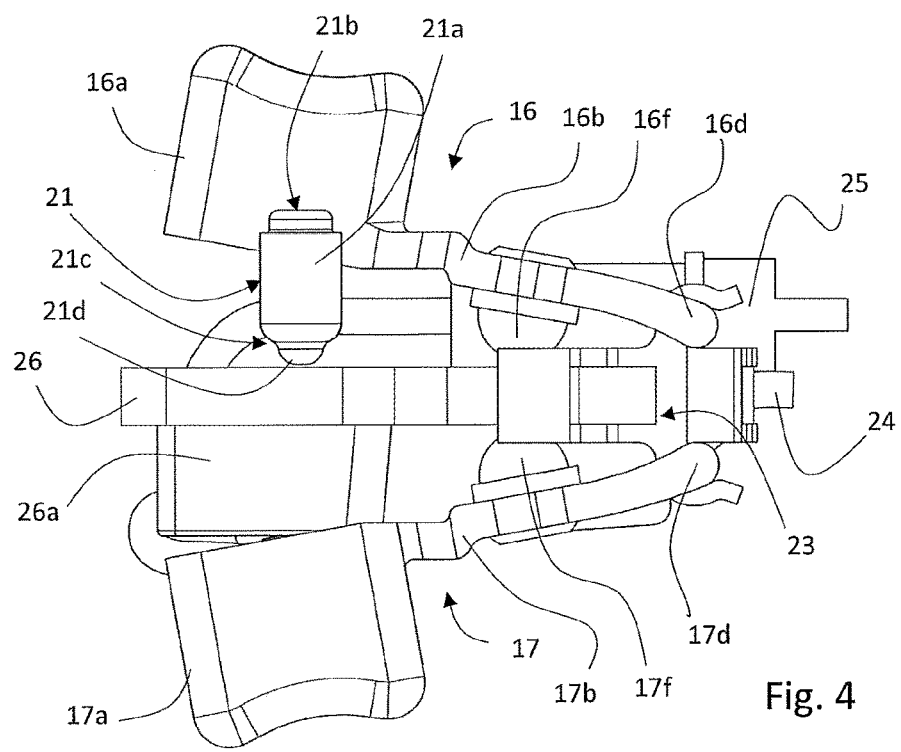
FIG. 4 is a side view of the internal components of the control device of FIG. 3.
Figure 11:
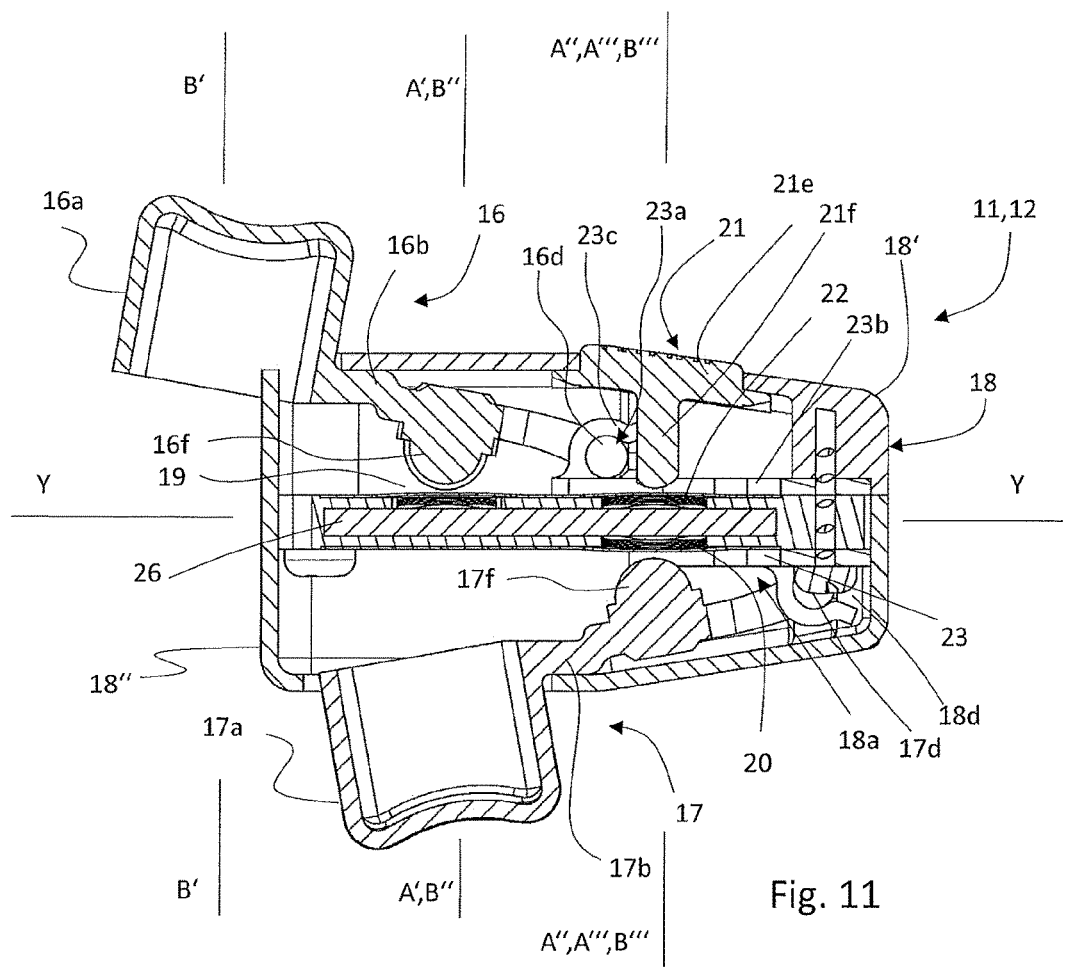
FIG. 11 is a sectional view of the control device of FIG. 10.

In the embodiment of FIGS. 4, 7 and 11, the first and the second manual actuation member 16,17 are brought back into their rest position through just the elastic return action exerted by the respective diaphragm switch 19,20. In this way, a good feeling of actuation—the so-called click feeling—of the manual actuation member 16,17 is obtained without the need to use further elements.

Figure 12:
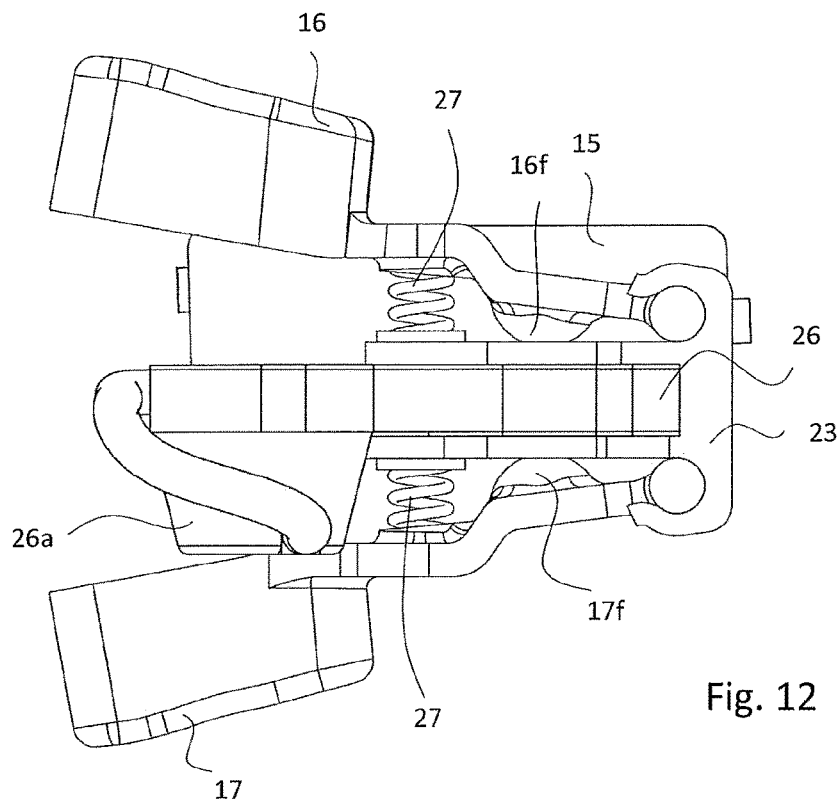
FIG. 12 is a side view of the internal components of a fourth embodiment of a control device of a bicycle electronic system according to the present invention.
Figure 13:
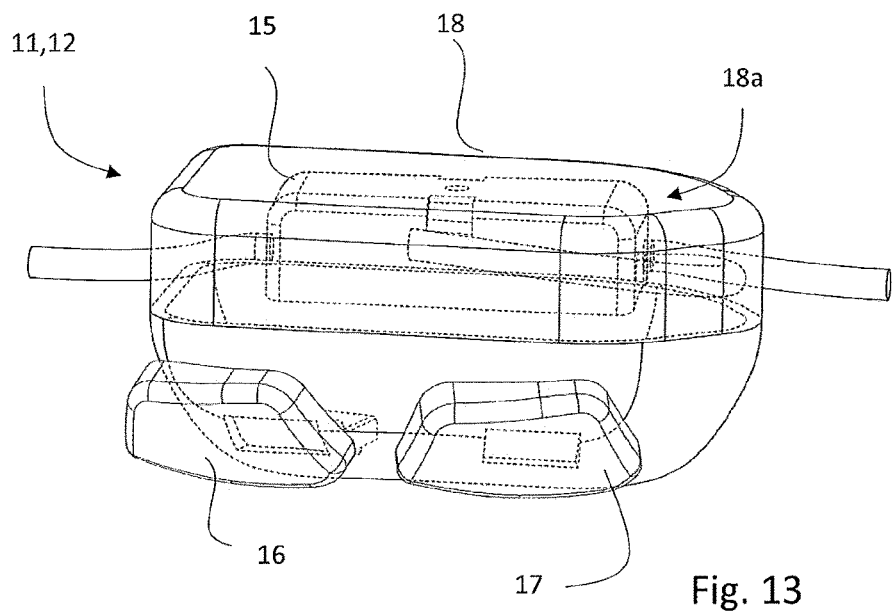
FIG. 13 is a partially transparent axonometric view of a fifth embodiment of a control device of a bicycle electronic system according to the present invention.
Figure 14:
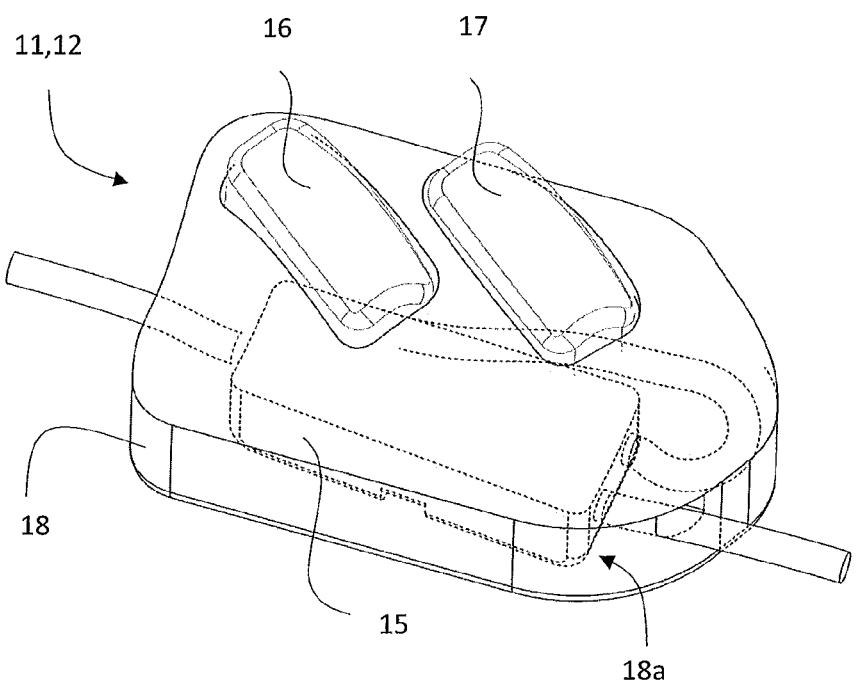
FIG. 14 is a partially transparent axonometric view of a sixth embodiment of a control device of a bicycle electronic system according to the present invention.

In alternative embodiments, in addition to the dome-shaped actuation element 16f,17f there is a return spring 27 for example of the helical type (FIG. 12).

Alternatively, the actuation element 16f,17f is an actuation tack that extends inside the return spring 27 (FIG. 8).

The return spring 27 acts as a return element to further bias the return to the rest position of the first and second manual actuation members 16,17. In this way the click feeling of such manual actuation members 16,17 is increased.

The first and second manual actuation members 16,17 are constrained in such a way as to be free to rotate at their own pin element 16d,17d to a releasable holding member 23 comprising first elastically deformable holding seats 23a suitable for holding the pin elements 16d,17d by shape and/or forced fitting.

The releasable holding member 23 further comprises a hollow central body 23b that defines a second seat suitable for enclosing the printed circuit 26 to fix in position the holding member 23 at such a printed circuit 26.

From such a central body 23b a plurality of C-shaped projections 23c extend, intended to wrap around the pin elements 16d,17d of the first and second manual actuation member 16,17, thus making the first holding seats 23a.

A first group of C-shaped projections 23c is intended to receive a pin element 16d of a first manual actuation member 16, and a second group of C-shaped projections 23c, which extends from the central body 23b in the opposite direction to the first group, is intended to receive a pin element 17d of a second manual actuation member 17.

Preferably, the C-shaped projections are arranged with the opening of the "C" facing towards the inner wall of the containment casing 18 so that the first holding seats 23a of the pin element 16d,17d are defined by such projections 23c and, in addition, by the inner wall of the containment casing 18 as shown in FIGS. 3-8 and 11.

Preferably, at the projections 23c of the releasable holding member 23, the containment casing 18 comprises at least one rib 18d (cf. FIGS. 3, 7, 8 and 11) suitable for cooperating with such projections 23c to hold the pin elements 16d,17d once inserted in the respective holding seats 23a.

Alternatively, the C-shaped projections are arranged with the opening of the "C" facing towards the inside of the containment casing 18, as shown in FIG. 12.

Figure 9:
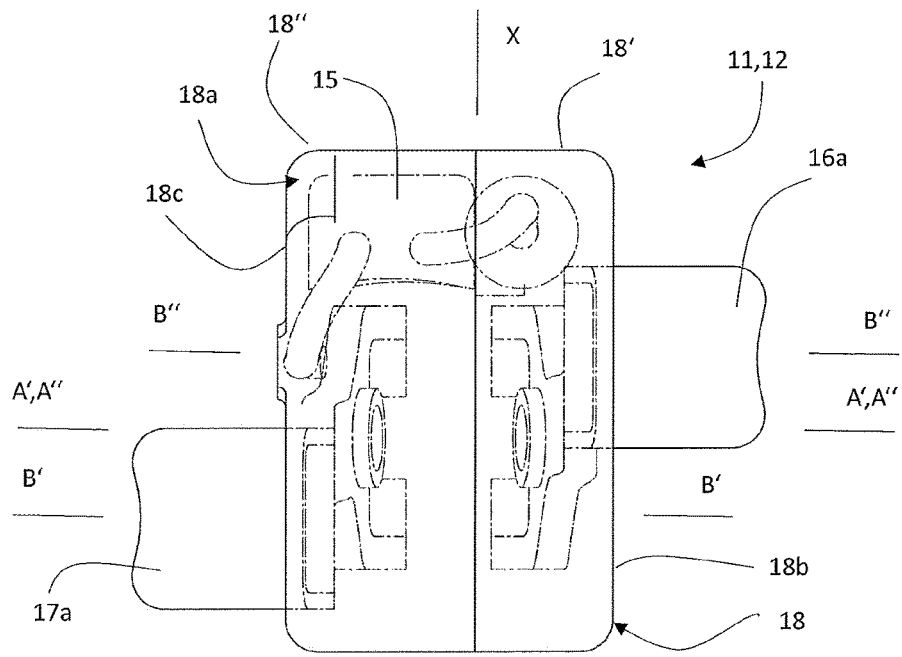
FIG. 9 is a partially transparent side view of the control device of FIG. 8 in assembled configuration.

The first and second manual actuation member 16,17 are arranged with respect to the containment casing 18 so as to have actuation axes B',B" that are parallel to one another and do not coincide, as clearly illustrated in FIG. 9.

In particular, according to the embodiments of FIGS. 3 to 12, the manual actuation bodies 16a,17a of the first and second manual actuation members 16,17 are arranged, with respect to a first one X of the two directions of extension of the two opposite faces 18b,18c of the containment casing 18, in different positions with respect to one another, therefore not overlapping one another or at most only partially overlapping.

Figure 10:
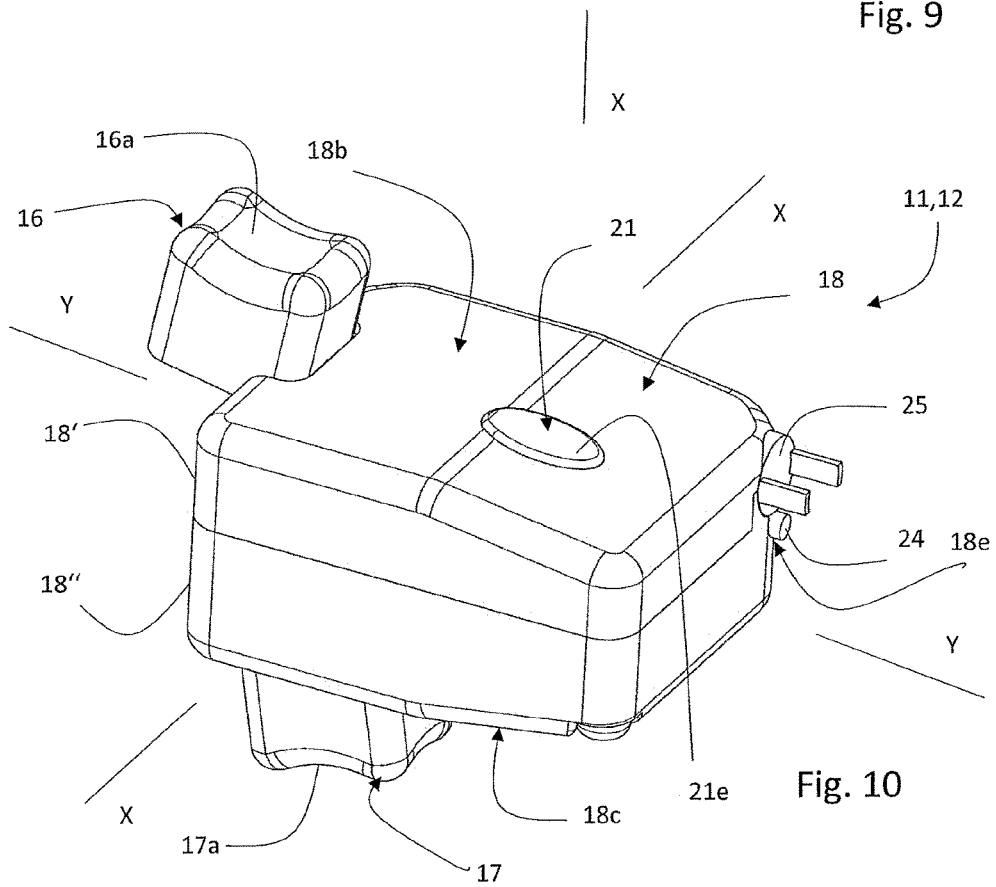
FIG. 10 is an axonometric view of a third embodiment of a control device of a bicycle electronic system according to the present invention.

In the embodiment illustrated in FIGS. 10 and 11, a first manual actuation member 16 has, in addition, its actuation axis B' passing externally with respect to the opposite faces 18b,18c of the containment casing 18, therefore having a misalignment with respect to the second manual actuation member 17 also along the second direction of extension Y of the two opposite faces 18b,18c of the containment casing 18.

For this purpose, the groups of projections 23c of the releasable holding member 23 that extend from the central body 23b in opposite directions, are made in different positions along the second direction of extension Y of the faces 18b,18c of the containment casing 18.

In this way, holding seats 23a of the pin elements 16d,17d of the lever arms 16b,17b are formed spaced apart along such a second direction of extension Y, allowing the actuation axes B',B" of the manual actuation members 16,17 to be equally spaced apart along such a second direction of extension Y.

Preferably, the control devices 11,12 according to the embodiments illustrated in FIGS. 4, 5, 7, 8, 10 and 11 comprise, in addition, a third manual actuation member 21 acting on a respective third switch 22. The third switch 22 is preferably also of the elastic diaphragm type.

In the embodiment of FIGS. 4 and 5, the third manual actuation member 21 comprises a cylindrical body 21a faced flush, at a first end 21b thereof, at a face 18b,18c of the containment casing 18 and is provided, at a second end 21c thereof, with an actuation element 21d made like a dome-shaped projection.

The dome-shaped projection 21d is eccentric with respect to the axis of the cylindrical body 21a, so that also the third manual actuation member 21 has its actuation axis B'" parallel to and not coinciding with the actuation axis A'" of the respective third switch 22 as shown in FIG. 5.

In the embodiment of FIGS. 10 and 11, the third manual actuation member 21 comprises a mushroom-shaped body provided with an enlarged part 21e that, being faced flush at a face 18b of the containment casing 18, acts as a manual actuation interface, and with a central stem 21f that extends towards the inside of the containment casing 18, ending substantially at the third switch 22. In such an embodiment, the third manual actuation member 21 has its actuation axis B''' parallel to and coinciding with the actuation axis A''' of the respective third switch 22 as shown in FIG. 11.

In alternative embodiments that are not illustrated, the third manual actuation member 21 is faced at a face 18b,18c of the containment casing 18, projecting therefrom.

In the embodiment illustrated in FIGS. 10 and 11, some of the C-shaped projections 23c of the releasable holding member 23 are arranged with the opening of the "C" facing towards the central stem 21f of the third mushroom-shaped manual actuation member 21.

In this way, the holding seats 23a of the pin element 16d are defined by such projections 23c and, in addition, by the wall of the stem 21f as shown in FIG. 11.

From the description that has been made, the features of the control device of a bicycle electronic system, as well as of the bicycle electronic system using the same object of the present invention are clear, as the relative advantages are also clear.

Further variants of the embodiments described above are possible, without departing from the teachings of the invention.

Finally, it is clear that the control device of a bicycle electronic system and the relative bicycle electronic system thus conceived can undergo several modifications and variants, all of which are encompassed by the invention; moreover, all of the details can be replaced by technically equivalent elements. In practice, the materials used, as well as the sizes, can be whatever according to the technical requirements.

What is claimed is:

1. A control system of a bicycle electronic system comprising at least one pair of control devices to impart at least one manual command to said bicycle electronic system, and at least one input multiplier configured for receiving at least one manual command entered by at least one control device of said at least one pair of control devices, and routing it into said bicycle electronic system, wherein at least one first control device of said at least one pair of bicycle control devices includes a containment casing, containing inside it at least one switch, and at least one manual actuation member faced at said containment casing and acting on a respective switch of said at least one switch for imparting at least one manual command to said bicycle electronic system, wherein said containment casing is provided with a housing seat configured to receive said at least one input multiplier able to be connected to said at least one switch to receive said manual command when said at least one manual actuation member activates said respective switch.

2. A control device of a bicycle electronic system comprising a containment casing that contains at least one switch, and at least one manual actuation member faced at said containment casing and acting on a respective switch of said at least one switch for imparting at least one manual command to said bicycle electronic system, wherein said at least one manual actuation member comprises a lever arm constrained at a first end to a pin element and at a second end to a manual actuation body faced at said containment casing, said lever arm comprising an actuation element facing towards said respective switch, and wherein said pin element is constrained so as to be free to rotate to a releasable holding member comprising at least one elastically deformable seat suitable for holding said pin element by shape and/or forced fitting.

3. A control system of a bicycle electronic system comprising at least one pair of control devices to impart manual commands to said bicycle electronic system, at least one input multiplier configured to receive the manual commands entered by said at least one pair of control devices, and at least one switch of said at least one pair of control devices arranged inside a containment casing, and said containment casing includes a housing seat configured to receive said at least one input multiplier, and said at least one input multiplier routes the manual commands into said bicycle electronic system.

4. The control system of a bicycle electronic system according to claim 3, wherein said containment casing contains at least one manual actuation member faced at said containment casing and acting on a respective switch of said at least one switch for imparting at least one of said manual commands to said bicycle electronic system.

5. The control system of a bicycle electronic system according to claim 4, wherein said at least one input multiplier is arranged inside said first control device of a bicycle electronic system.

6. A bicycle electronic system comprising at least one electronic/electromechanical unit suitable for receiving manual commands and a control system according to claim 3, said at least one input multiplier routing said at least one manual command received towards said electronic/electromechanical unit.

7. The bicycle electronic system according to claim 6, wherein said electronic/electromechanical unit comprises at least one front and/or rear derailleur.

8. A control device of a bicycle electronic system comprising a containment casing that contains at least one switch, and at least one manual actuation member faced at said containment casing and acting on a respective switch of said at least one switch for imparting at least one manual command to said bicycle electronic system, and a housing seat within the containment casing is configured to receive at least one input multiplier able to be connected to said at least one switch to receive said manual command when said at least one manual actuation member activates said respective switch, wherein said at least one input multiplier is able to be connected to at least one switch of another control device.

9. The control device of a bicycle electronic system according to claim 8, wherein said housing seat is suitable for receiving said at least one input multiplier in a removable manner.

10. The control device of a bicycle electronic system according to claim 8, comprising at least one input multiplier housed in said seat of said containment casing and connected to said at least one switch.

11. The control device of a bicycle electronic system according to claim 8, wherein said at least one manual actuation member has its actuation axis parallel to and not coinciding with an actuation axis of said respective switch.

12. The control device of a bicycle electronic system according to claim 8, comprising at least two manual actuation members faced at opposite faces of said containment casing, said at least two manual actuation members having actuation axes that are parallel to one another and do not coincide.

13. The control device of a bicycle electronic system according to claim 12, wherein at least one manual actuation member of said at least two manual actuation members has actuation axis passing externally with respect to said opposite faces of said containment casing.

14. The control device of a bicycle electronic system according to claim 8, wherein said at least one manual actuation member comprises a lever arm constrained at a first end to a pin element and at a second end to a manual actuation body faced at said containment casing, said lever arm comprising an actuation element facing towards said respective switch.

15. The control device of a bicycle electronic system according to claim 14, wherein said pin element is constrained so as to be free to rotate to a releasable holding member comprising at least one elastically deformable seat suitable for holding said pin element by shape and/or forced fitting.

16. The control device of a bicycle electronic system according to claim 15, wherein said holding member comprises a central body from which a plurality of C-shaped projections extend, intended to wrap around said pin element, making said holding seat.

17. The control device of a bicycle electronic system according to claim 16, wherein said C-shaped projections are arranged with an opening of the "C" facing towards an inner wall of said containment casing.

18. The control device of a bicycle electronic system according to claim 17, wherein at said inner wall, said containment casing comprises at least one rib suitable for cooperating with said releasable holding member to hold said pin element once inserted in said seat.

* * * * *